3,050,834
COMPOSITE METAL ARTICLE
John B. Ulam, Canonsburg, Pa., assignor to Allegheny Ludlum Steel Corporation, Brackenridge, Pa., a corporation of Pennsylvania
No Drawing. Filed Apr. 27, 1959, Ser. No. 808,912
4 Claims. (Cl. 29—196.3)

This invention relates to the bonding of copper to stainless steel and relates in particular to a composite stainless steel-copper alloy article.

In the manufacture of cooking utensils, such as pots and pans, stainless steels and particularly austenitic stainless steels are ideal materials for such application in most respects. These steels are resistant to corrosion, may be buffed and polished to give an attractive bright appearance, are resistant to heat, and may be easily cleaned. Another advantageous feature of stainless steel is that it may be easily and conveniently drawn into the desired shape of the pot or pan. However, stainless steel is susceptible to localized heating; that is, when heated, hot spots develop or localized areas become hotter than other areas, resulting in the food burning at these areas. Modern techniques to overcome this disadvantage include bonding sheets of stainless steel to the outer surfaces of copper to obtain a utensil with the uniform heat transfer characteristics of copper while retaining the superior surface properties of the stainless steel. The most desirable method of bonding copper to stainless steel in manufacturing such bimetallic utensils is to join sheets or plates of such metals so as to form composite structures and roll them to a finished gauge simultaneously. Such composite sheet or strip material is then drawn to the desired shaped pot or pan. By such a method it is possible to clad the copper or copper alloy on both sides so that copper or copper alloy is not exposed to heat and air, and the superior oxidation and corrosion resistance properties of the stainless steel may be employed on both the inside and outside surface of the utensil. In addition, whether or not one surface of the copper is to be exposed or the clad stainless steel is to be placed on both sides of the copper, far more effective and economical manufacturing means may be employed by rolling a composite stainless steel-copper structure to final gauge and deep drawing than by bonding copper or copper alloy to the outside surface of the finished product.

When stainless steel is bonded to copper either on one side or on both, and the structure is subsequently cold worked, such as by cold rolling or deep drawing, it must be annealed to remove the internal stresses imposed by such cold working. It may be necessary to make several draws on a given utensil to effect the final desired shape, and the part must be annealed between each drawing operation. After annealing at a sufficiently high temperature to relieve the stress build-up in the stainless steel (temperatures of at least 1300° F.), it is found that the subsequently cold worked material exhibits a surface condition appearing as a pebbling effect which can be described as similar to the surface of an orange peel or alligator skin. This condition is that which is commonly referred to in the metallurgical field as "orange peel effect." Although an orange peel effect may be controlled to some extent by heat treatment and surface finishing after cold mechanical reduction of the composite material, the phenomenon has greatly retarded the use of such technique in the manufacture of cooking utensils from composite stainless steel and copper.

It has now been found that by employing a copper alloy containing chromium within a critical and well-defined range of composition, the orange peel effect may be eliminated and a composite article may be manufactured by mechanical reduction of the composite stainless steel-copper alloy structure.

It is the object of the present invention to provide a flat composite material, such as sheet or strip, composed of copper alloy sandwiched between and bonded to stainless steel clad that will not exhibit surface roughness when alternately annealed and cold worked.

It is also an object of the present invention to provide, in the production of clad metal, for utilizing a copper base alloy to which stainless may be bonded on one side only, which stainless is free from orange peel effect after the clad metal is annealed and cold worked.

A still further object of the present invention is to provide, in a clad metal product, for utilizing a deoxidized copper alloy that contains from about .01% to .85% chromium, such alloy when bonded to stainless steel being capable of being cold drawn without producing a roughened surface on the stainless steel.

Other objects and advantageous features will be obvious from the following specification.

In general, the present invention relates to the discovery that by employing a deoxidized copper alloy containing chromium within the range of from about .01% to about .85%, a copper-stainless steel clad structure may be fabricated into finished and drawn products by alternate annealing and cold working without effecting the usual adverse surface condition known as orange peel.

It is thought that the surface condition known as orange peel in the finished drawn part is the result of telegraphing large copper grains through the layers of stainless steel whether it be a single or double armor clad product. Due to the pressing or compression action of all the known methods of drawing, no matter how slight, the large grain size of copper or copper alloy results in the pebbling effect. Prior known methods of reducing these grains have failed to eliminate the condition. The large grains of the copper alloy are primarily due to the heat treatment that is necessary to relieve the stainless steel of stresses imposed by cold reduction. The stress of copper is released at a much lower temperature than that of the stainless steel, and when a temperature sufficiently high to recrystallize and soften the stainless is reached excessive grain growth takes place in the copper. Thus, the composite structure is one of fine grained stainless steel and large grained copper which inherently results in the orange peel effect. The minimum temperature for annealing the stainless steel clad is about 1300° F.; however, best results are obtained at much high temperatures of from about 1450° F. to 1750° F. The chromium addition to copper is believed to result in a second phase occurring in the copper matrix that inhibits the grain growth of the metal by mechanical obstruction. It has been determined that the ideal grain size for the copper alloy subsequent to annealing and prior to cold deformation is an average grain size of from about .025 mm. to .045 mm. diameter. The range of chromium required to maintain such a grain size has been found to be from about .01% to .85%. Also, it has been found that to retain ductility and heat transfer of properties in the copper one should not exceed about .85% chromium. On the other hand, less than about .01% chromium is not effective in retaining a fine grain copper structure while annealing at temperatures above 1300° F. so as to avoid the surface condition above mentioned.

A basic requirement of the copper alloy to be employed is that it be thoroughly deoxidized in order that the oxide combination does not build up at the bonding surface between the copper and the stainless steel and that the copper alloy possess the adequate and desired mechanical properties to sustain the drawing. Deoxidation is commonly effected by additions of phosphorus to the copper during its manufacture, usually within a range of from .01% to .04%. However, other additions, such as lithium, may be equally effective. Also, other additions to the copper alloy which do not interfere with the grain growth inhibiting properties of the chromium may be made. For example, additions of zinc, lead, tin, iron, manganese, aluminum, nickel and silicon may be desirable to impart specific properties to the copper alloy.

The stainless steel employed as cladding in the articles of the present invention may be any stainless steel containing from about 10% to 35% chromium; however, ferritic or martensitic stainless steels do not lend themselves to cold working, such as deep drawing, and therefore the problems of orange peel and surface defects do not arise in the ordinary use of these materials and the occasion to employ such materials as cladding seldom arises. On the other hand, any of the stainless steels which exhibit an austenitic structure may be employed for deep drawing. Such materials commonly contain from about 12% to 25% chromium and from about 5% to 25% nickel. Typical examples of such steels are AISI types 301, 302, 304, and 305. Other austenitic steels include those commonly referred to as the 200 series or those that possess an austenitic structure primarily due to their manganese, manganese plus nickel, carbon and nitrogen contents. Such steels may contain from about 12% to 25% chromium and up to 25% manganese. They generally contain some nickel and may contain nitrogen (up to about .50%). Any of the austenitic stainless steel compositions may contain up to about .2% carbon; however, the deep drawing grades will usually contain less than .1%. All such steel will contain about .040% maximum residual phosphorus and sulfur. Other additions for specific purposes may be added to the austenitic stainless steel composition, such as small but effective amounts of copper, molybdenum, columbium, tantalum, titanium, zirconium, tungsten, vanadium, boron, etc.

In utilizing the copper alloys of the prior art practice, the method of forming the copper alloy-stainless steel clad structure is incidental in that orange peel effect will occur on cold working or deep drawing regardless of the method employed in bonding the copper alloy to the stainless steel. Thus, as the stainless steel is bonded to the copper or clad on either side of the copper in such a manner as to effect a finished sheet ready for deep drawing, orange peel effect may be observed after drawing, annealing and finished drawing. On the other hand, orange peel effect is even more certain to occur where the stainless steel and copper are bonded before or during hot working or hot rolling and subsequent cold rolling to clad sheet product preparatory to subsequent deep drawing. According to this invention, it is necessary to employ copper that contains chromium within the designated range regardless of what method of cladding is to be employed. We have found that where stainless is to be clad on either side of the copper alloy, a convenient method is to form a sandwich-type structure, evacuate the structure and subsequently hot roll and cold roll to a finished sheet product. Such methods we taught by United States Patent No. 2,718,690 and co-pending application Serial No. 715,639, filed February 17, 1958, Frank A. Malagari, Jr. It is also recommended that the roll bonding method, such as disclosed by Patent No. 2,758,368 calling for the mechanical cleaning of the intended bonding surfaces and the sealing of the components to form a composite structure which is then evacuated and/or heated in an inert atmosphere prior to rolling, be utilized. Making of this metal composition can be accomplished by continuous rolling of coils, such as disclosed in the above-mentioned Patent 2,758,368, whereby the metal strands are brought into intimate contact after mechanically cleaning their surfaces intended for bonding, heating in an inert atmosphere or vacuum and applying pressure thereto. Billets or assemblies can be made by casting of the copper alloy onto stainless steel or inside two layers of stainless steel, thus resulting in a composite assembly with an as-cast structure. In using the above casting method, it is vitally important that the casting and heating of the outside claddings be done in an inert atmosphere or vacuum. The preferred manner of practicing the invention is utilization of the Ulam Patent No. 2,758,368, producing the metal combination in assemblies or strip, but any of the above-described methods can be used.

Micro examination of deep drawn stainless steel-copper alloy clad articles have shown that the desired copper grain size is from about .025 millimeter diameter to about .045 millimeter diameter. During cold working, the average diameter of copper alloy grain may well exceed .045 millimeter; however, if the chromium content of the copper alloy is within the range of from about .01% to .85% upon annealing with the temperature range of from about 1450° F. to 1700° F., recrystallization will effect a grain size of from between .025 millimeter to .045 millimeter.

Although the phenomena of orange peel effect is most pronounced on flat rolled composite products such as sheet and strip, it may occur on other composite stainless steel-copper products. For example, where stainless steel and copper are co-extruded to form composite copper-stainless steel tubes for use in heat exchangers, orange peel effect may adversely affect the surface of such a tube. Composite stainless steel-copper tubes may also be employed in the aircraft industry where a smooth surface is required. The use of a deoxidized copper containing from .01% to .85% chromium, as shown by the present invention, eliminates the uneven surfaces that may be experienced in composite articles manufactured in this manner.

The following specific examples are given to illustrate the articles of the present invention and in no way limit the invention or the claims to the exact embodiments set forth:

Copper base alloys were clad with AISI type 302 and 304 stainless steels in the manner described in the co-pending patent application Serial No. 715,639 (copper alloy being substituted for the molybdenum). Compacts consisting of copper alloy cores, stainless steel cladding and side bars were welded together to form compacts of the following specifications:

| Example | Clad | Core (percent) | | | Dimensions |
| --- | --- | --- | --- | --- | --- |
| | | Cr | P | Cu | |
| 1 | Type 304 | .15 | .035 | Bal. | 1½" x 26" x 32". |
| 2 | Type 302 | .03 | .03 | 99.94 | .900" x 13½" x 22¼". |
| 3 | Type 302 | .01 | .03 | 99.96 | .900" x 15½" x 22¼". |
| 4 | Type 302 | .38 | .02 | 99.60 | 1½" x 17½" x 31½". |

Each layer of the cladding and core for Examples 1 and 4 was ½" thick, while those of Examples 2 and 3 were approximately .300" thick. The side bars were fabricated from type 302 stainless steel. The assemblies were substantially evacuated of atmosphere, as set forth in co-pending application Serial No. 715,639, and were hot rolled within the temperature range of from about 1775° F. to 1825° F. Final gauge was approximately .179"/.186".

Metallographic samples were sheared from the hot rolled material of Example 1. The samples were annealed for 20 minutes at temperatures between 1425° F. and 1750° F., and the copper grain size of the core was determined. The results are listed in Table I below.

TABLE I

| Anneal, 20 minutes, A.C., ° F. | Range of copper grain size, mm. |
| --- | --- |
| 1,425 | .025/.090 |
| 1,450 | .025/.090 |
| 1,475 | .025/.090 |
| 1,500 | .025/.090 |
| 1,525 | .025/.090 |
| 1,550 | .025/.090 |
| 1,600 | .025/.090 |
| 1,650 | .025/.090 |
| 1,700 | .025/.090 |
| 1,750 | .045/.200 |

A piece of the hot rolled material from Example 1 was annealed at 1500° F. for 20 minutes, air cooled, pickled and cold rolled to .100". Metallographic size samples were sheared from the cold rolled sheet and annealed at different temperatures and times, and the copper grain size of the core was determined. The results are listed in Table II.

TABLE II

| Anneal, 10 minutes, A.C., ° F. | Copper grain size, mm. |
| --- | --- |
| 1,425 | .035 |
| 1,450 | .035 |
| 1,475 | .035 |
| 1,500 | .035 |
| 1,525 | .035 |
| 1,550 | .035 |
| 1,575 | .035 |
| 1,600 | .035 |
| 1,650 | .035 |
| 1,700 | .035 |
| 1,750 | .035/.200 |

A portion of the cold rolled material was annealed at 1650° F. for 16 minutes, air cooled, pickled and cold rolled to .050". As before, metallographic size samples of the cold rolled sheet were annealed at various temperatures and times and the copper grain size of the core was determined. The results are listed in the following Table III:

TABLE III

| Anneal, 5 minutes, A.C., ° F. | Copper grain size, mm. |
| --- | --- |
| 1,600 | .025 |
| 1,650 | .025 |
| 1,675 | .025 |
| 1,700 | .025 |
| 1,725 | .025 |
| 1,750 | .150 |

The remaining hot rolled material from Example 1 was annealed at 1650° F. for 5 minutes, air cooled and pickled. The mechanical properties are as given in Table IV.

TABLE IV

| Yield strength, p.s.i. | Tensile strength, p.s.i. | Percent elong. | Ex. $10^{-6}$ | Erichsen cup ductility |
| --- | --- | --- | --- | --- |
| 43,330 | 84,850 | 45.7 | 19.8 | 11.82 |

Two hot rolled sheets from the material of Example 1 were annealed at 1650° F. for 15 minutes, air cooled and pickled. In this condition, the copper grain size was determined to be .045/.065 mm. Thereafter, the two sheets were cold rolled to .100", annealed at 1650° F. for 16 minutes, air cooled and pickled, after which the copper grain size was determined to be .045 mm. Each sheet was then sheared in half, and the four sheets were cold rolled to .050", annealed at 1650° F. for 4 minutes, air cooled and pickled. Two of the sheets were skin passed, and all the sheets were leveled. The final product consisted of 4 sheets (.050" x 36" x 118") whose weight was 252 pounds. The properties of this material are given in Table V.

TABLE V

Copper grain size (non-ferrous) _____ mm__ .025
Erichsen cup ductility _____ mm__ 11.92
Olsen cup ductility _____ inch__ .412

| | Longitudinal | Transverse |
| --- | --- | --- |
| 0.2% Yield strength, p.s.i. | 42,190 | 40,730 |
| Tensile strength, p.s.i. | 85,050 | 82,220 |
| Percent elongation | 46.2 | 47.7 |
| Young's modulus | 24.7 | 24.3 |

It may be observed from the results of Example 1 shown in Tables I to V that by employing a deoxidized copper core material containing from about .01 to .85% chromium, when employing austenitic stainless steel cladding, grain growth is restricted in the copper. It is seen in Table I that excessive grain growth does not occur until an annealing temperature of about 1750° F. is employed. In Table II it is shown that the cold rolled and annealed material does not exhibit excessive copper grain size until a temperature of about 1750° F. is employed. Table III illustrates that material cold rolled to .050" gauge does not exhibit large grains unless annealed at a temperature of about 1750° F. Tables IV and V show the mechanical properties of the finished product.

Metallographic size samples were sheared from the hot rolled material of Examples 2, 3 and 4. The samples were annealed, cold rolled and re-annealed at temperatures of from 1450° F. to 1650° F. and the copper grain size determined. The results are listed in Table VI below:

TABLE VI

| Treatment | Copper grain size, mm. | | |
| --- | --- | --- | --- |
| | Example 2 | Example 3 | Example 4 |
| As hot rolled (.187" Ga.) | .065/.200+ | .090/.200+ | .065/.120 |
| As hot rolled + 1,450° F., 15 min., A.C. | .065 | .065/.200+ | .065 |
| Annealed 1450° F., 15 min., A.C. + cold roll to .100": | | | |
| 1450° F., 10 min., A.C. | .035 | .045 | .010 |
| 1500° F., 10 min., A.C. | .045 | .065 | .010 |
| 1550° F., 10 min., A.C. | .045/.200 | .090 | .010 |
| 1600° F., 10 min., A.C. | .090/.200 | .150 | .015 |
| 1650° F., 10 min., A.C. | .090/.200 | .200 | .015 |
| Annealed 1450° F., 10 min., A.C. + cold roll to .050": | | | |
| 1450° F., 5 min., A.C. | .035 | .025 | .010 |
| 1500° F., 5 min., A.C. | .045 | .035 | .010 |
| 1550° F., 5 min., A.C. | .045/.200 | .045/.090 | .010 |
| 1600° F., 5 min., A.C. | .045/.200 | .045/.120 | .015 |
| 1650° F., 5 min., A.C. | .045/.200 | .045/.150 | .015 |

Test specimens for obtaining mechanical properties were sheared from .050 inch cold rolled material and annealed. The results are listed in Table VII.

TABLE VII

| Assembly No. | Anneal 5 min., A.C., °F. | Yield strength (0.2% offset), p.s.i. | Tensile strength, p.s.i. | Percent elong. (2″) | Erichsen cup ductility, mm. |
|---|---|---|---|---|---|
| Example 2 | 1,475 | 47,350 | 86,560 | 48.5 | 10.17 |
| Example 3 | 1,475 | 52,760 | 92,710 | 47.0 | 10.05 |
| Example 4 | 1,600 | 52,520 | 93,370 | 44.2 | 9.89 |

Samples of the hot rolled material were also reduced 50% in each of two cold-roll cycles between anneals (1450° F.–10 minutes) and tested for mechanical properties. Results are reported in Table VIII below:

TABLE VIII

| Assembly | Yield strength (transverse) | Tensile strength (transverse) | Elongation | Hardness (Rockwell B) | Grain size (copper), mm. | Final anneal |
|---|---|---|---|---|---|---|
| Example 2 | 41,650 | 82,510 | 44.0 | 77 | .025 | 1450° F., 10 min. |
| Example 3 | 41,420 | 84,220 | 44.0 | 77–78 | .025 | Do. |
| Example 4–1 | 51,160 | 96,680 | 40.0 | 91–93 | .035 | 1550° F., 5 min. |
| Example 4–2 | 48,170 | 91,330 | 44.5 | 81–83 | .035 | Do. |

It may readily be observed from Table VI that the final cold rolled copper alloy grain size for copper alloys containing as little as .01% chromium may be maintained at .045 mm. diameter level though annealed at 1450° F. for 15 minutes. Higher chromium content copper is shown to resist grain growth at even higher temperatures. Example 4 is shown to exhibit a grain size of only .015 mm. after a treatment of 1650° F. for 10 minutes.

Material from each of the above examples, cold rolled to .050″ gauge with intermediary and final anneals at 1450° F. for 10 minutes, were drawn into various shaped cooking utensils (including two square steam table inserts). For comparison similarly prepared AISI type 302 stainless steel clad products, in which ordinary phosphorus deoxidized copper was employed as a core material, were drawn into like utensils under the same conditions. No evidence of orange peel appeared in any of the drawn parts made from the examples of the present specification; however, the ordinary phosphorus deoxidized copper material exhibited visible orange peel effect that could not be removed by polishing or grinding.

I claim:
1. A flat composite metallic article comprising at least one layer of austenitic stainless steel bonded to at least one layer of a deoxidized copper base alloy that consists essentially of from .01% to .85% chromium, balance copper.
2. A flat metallic article comprising at least one layer of an austenitic stainless steel bonded to at least one layer of a copper base alloy that consists essentially of from about .01% to .04% phosphorus, .01% to .85% chromium, balance copper.
3. A flat metallic article comprising a layer of a copper base alloy bonded on each side by an austenitic stainless steel, said copper base alloy consisting essentially of from about .01% to .04% phosphorus, .01% to .85% chromium, balance copper.
4. A flat composite article comprising a layer of an austenitic stainless steel bonded to a copper base alloy, said copper base alloy consisting essentially of from about .01% to .04% phosphorus, .01% to .85% chromium, balance copper.

References Cited in the file of this patent

UNITED STATES PATENTS

| | | |
|---|---|---|
| 2,053,096 | McKay | Sept. 1, 1936 |
| 2,254,944 | Hensel | Sept. 2, 1941 |
| 2,281,691 | Hensel | May 5, 1942 |
| 2,325,659 | Chace | Aug. 3, 1943 |
| 2,482,898 | Chace | Sept. 27, 1949 |
| 2,533,589 | Kronouer | Dec. 12, 1950 |
| 2,558,093 | Kinney | June 26, 1951 |
| 2,718,690 | Ulam | Sept. 27, 1955 |
| 2,845,698 | Giovannuci | Aug. 5, 1958 |
| 2,941,289 | Chace | June 21, 1960 |